United States Patent
Vogelsang et al.

(10) Patent No.: US 7,188,712 B2
(45) Date of Patent: Mar. 13, 2007

(54) HYDRODYNAMIC BRAKES

(75) Inventors: Klaus Vogelsang, Crailsheim (DE); Walter Eberlein, Satteldorf (DE); Martin Deeg, Wört (DE)

(73) Assignee: Voith Turbo GmbH & Co. KG, Heidenheim (DE)

(*) Notice: Subject to any disclaimer, the term of this patent is extended or adjusted under 35 U.S.C. 154(b) by 0 days.

(21) Appl. No.: 10/512,665

(22) PCT Filed: Apr. 2, 2003

(86) PCT No.: PCT/EP03/03407

§ 371 (c)(1),
(2), (4) Date: Dec. 17, 2004

(87) PCT Pub. No.: WO03/093695

PCT Pub. Date: Nov. 13, 2003

(65) Prior Publication Data

US 2005/0173212 A1    Aug. 11, 2005

(30) Foreign Application Priority Data

May 2, 2002    (DE)    .............................. 102 19 753

(51) Int. Cl.
F16D 57/00    (2006.01)
(52) U.S. Cl. ....................................... 188/290; 60/337

(58) Field of Classification Search ................. 188/296, 188/290; 60/337, 363, 364, 365; 464/60, 464/23; 74/412, 665
See application file for complete search history.

(56) References Cited

U.S. PATENT DOCUMENTS

| 2,359,930 A | | 10/1944 | Miller |
| 3,467,225 A | | 9/1969 | Steffen et al. |
| 4,043,434 A | * | 8/1977 | Braschler .................... 188/296 |
| 4,194,600 A | * | 3/1980 | Armasow et al. ........... 188/296 |

FOREIGN PATENT DOCUMENTS

| DE | 1 600 154 | 1/1970 |
| DE | 196 46 597 | 5/1998 |
| DE | 299 03 829 | 8/2000 |
| EP | 0 507 745 | 1/1992 |
| WO | WO 98/35171 | 8/1998 |
| WO | WO 00/52352 | 9/2000 |

* cited by examiner

Primary Examiner—James McClellan
Assistant Examiner—Kochi Rashid
(74) Attorney, Agent, or Firm—Baker & Daniels LLP

(57) ABSTRACT

A retarder having the following features: a rotor (1) and a stator (2) that, together, form a working space (3); a hollow shaft (4) for connecting, in a rotationally fixed manner, an input shaft (5), which is near a transmission, to an output shaft (6), which is near a cardan shaft, and; the hollow shaft support s the rotor by means of a screw thread (4.1.1).

12 Claims, 2 Drawing Sheets

HYDRODYNAMIC BRAKES

CROSS-REFERENCE TO RELATED APPLICATION

This application is related to and claims the benefit under 35 U.S.C. §119 and 35 U.S.C. §365 of International Application No. PCT/EP2003/03407, filed Apr. 2, 2003.

BACKGROUND OF THE INVENTION

The invention refers to a hydrodynamic brake, generally known as "retarder", in particular for motor vehicles.

Such retarders contain two impeller wheels of which one stays fixed (the stator) and the other revolves (the rotor) The two impeller wheels together form a torus-shaped working space. This working space is used for the purpose of braking and is to this end filled up with a work medium, for example with oil, whereas in the non-braking operation area no work medium is present.

In this working space in the non-braking area there is present, however, air. This produces an undesirable braking momentum and thereby power dissipation which increases the energy consumption.

Numerous measures have become known with the intention of eliminating this power dissipation. One of these measures consists therein that the rotor and stator are to be made to be slideable relative to one another in an axial direction. In the non-braking operation the rotor and the stator are made to travel away from one another so that the above-mentioned energy dissipation does not occur.

DE 1600 154 A1 describes this kind of a retarder. Hereby, in order to eliminate the so-called ventilation losses in the non-braking operation, the stator is made to travel away from the rotor. Thereby the rotor stays in an axial direction in one and the same place.

In the known forms of execution the rotor is carried on a hollow shaft. The hollow shaft must have bearings. To that end a bearing is located against the casing of the stator. Such a design is elaborate and furthermore occupies a substantial amount of construction space.

Hydrodynamic clutches with impeller wheels which can be moved to one another are also known. An example is U.S. Pat No. 2 359 930, which demonstrates a drive shaft with a pump wheel (impeller) and a driven shaft with a turbine wheel (runner), whereby the pump wheel has its bearing on the outer thread of the drive shaft in such a way that it can be driven towards or away from the turbine wheel. On a front end of the drive shaft there is provided a ring with springs, whereby the springs exert a force onto the pump wheel, axial to the drive shaft in the direction of the drive.

During starting up, that is to say during the rotation acceleration of the drive shaft, a force works on the pump wheel which causes the pump wheel to migrate onto the thread against the spring force in the direction of the turbine wheel. During normal operation it is held in this position, as long, that is, as the loading to be borne by the drive shaft is for the most part held at a constant. As soon, however, as this loading is reduced, or when the drive line moves over into coast drive, that is to say when the output shaft rotates at a higher revolution speed than the drive shaft, the spring force becomes predominant and pushes the pump wheel into a position at a distance away from the turbine so that the flow cycle in the working space between pump wheel and turbine wheel can no longer effectively transfer a revolution momentum from the pump wheel to the turbine wheel.

The illustrated hydrodynamic coupling thus transmits during start-up and in virtually stationary operation a torque from the drive motor to the driven machine via a flow circulation. In the case of a load reduction on the drive side, the pump impeller is stopped by the turbine wheel (as is shown) and the flow circulation is disturbed and the transmission of torque from the drive motor to the driven machine is automatically interrupted. Hydrodynamic braking of the driven machine is not possible with this hydrodynamic coupling because at first there are no means for fixing the pump impeller and the pump impeller is in a remote position relative to the turbine wheel further in a state which makes braking desirable, namely at the time when the driven shaft rotates faster than the driving shaft.

SUMMARY OF THE INVENTION

Document WO 00 52352 A shows a retarder with the features as combined in the preamble of claim 1. EP-A-0 507 745 shows the connection of an input shaft with an output shaft.

The invention is based on the object of providing a retarder of the kind mentioned above in such a way that the bearing of the hollow shaft is simplified. In particular, a retarder with a simplified bearing of the hollow shaft . . . automatically, axially driven away from the stator and, at the beginning of the braking operation, towards it.

This task is solved by creating between the rotor and the hollow shaft, a connection which is on the one hand torsionally strong and which on the other hand, however, allows for axial relocatability.

In a further development of the invention in one form thereof return springs are provided which drive the rotor away from the stator during non-braking operation. In order to prevent these return springs from being subject to tilting on the longitudinal axis during the shift revolution movement of the rotor, which could lead to an early functionimpedance and the destruction of the springs, measures have been taken to make possible a free turning of the springs around the longitudinal axis of the rotor. It is in particular advantageous that measures can be taken to ensure that the springs can freely turn around their own axis during the traveling of the rotor in an axial direction. In this way the opening and closure of the working space during the transfer from braking operation to non-braking operation or, respectively, vice-versa, can take place without any hindrance. The springs, which act upon the rotor in an axial direction, constantly work as guided and tilt-free and, for this reason, have a stability of function and a long life duration. They are thereby at all times freely rotational so that they cannot be subjected to any disadvantageous torsion forces.

The hollow shaft of the retarder according to the invention fulfills two functions: in the first place it provides a torsionally strong connection between the drive shaft and the output shaft, that is to say—the driven shaft. In the second place it carries the rotor which is axially relocatable against the stator. It is particularly advantageous in one for of the invention that it carries a suspender ring which is coaxial to the longitudinal axis of the retarder and which is rotationally on free bearings on the hollow shaft. Thereby the suspender ring features guide components for the guiding of the springs (return springs) during the transmission revolution movement of the rotor. In order to prevent any tilting of the springs the suspender ring is connected with torsional rigidity, or as good torsional rigidity, to the rotor, so that the relative revolution movement of the rotor during the shifting of the rotor against the stator is transferred to the suspender ring.

So that the retarder can perform its braking function a work medium is fed into the working space. Because of the hydrodynamic configuration of the blades of the rotor and the stator, so much flow will be produced in the working space that the rotor will be driven, against the force of the afore-mentioned springs in an axial direction towards the stator, so that the working space is finally closed and the retarder can fully and in entirety carry out its braking function.

DETAILED DESCRIPTION

Figure 1:
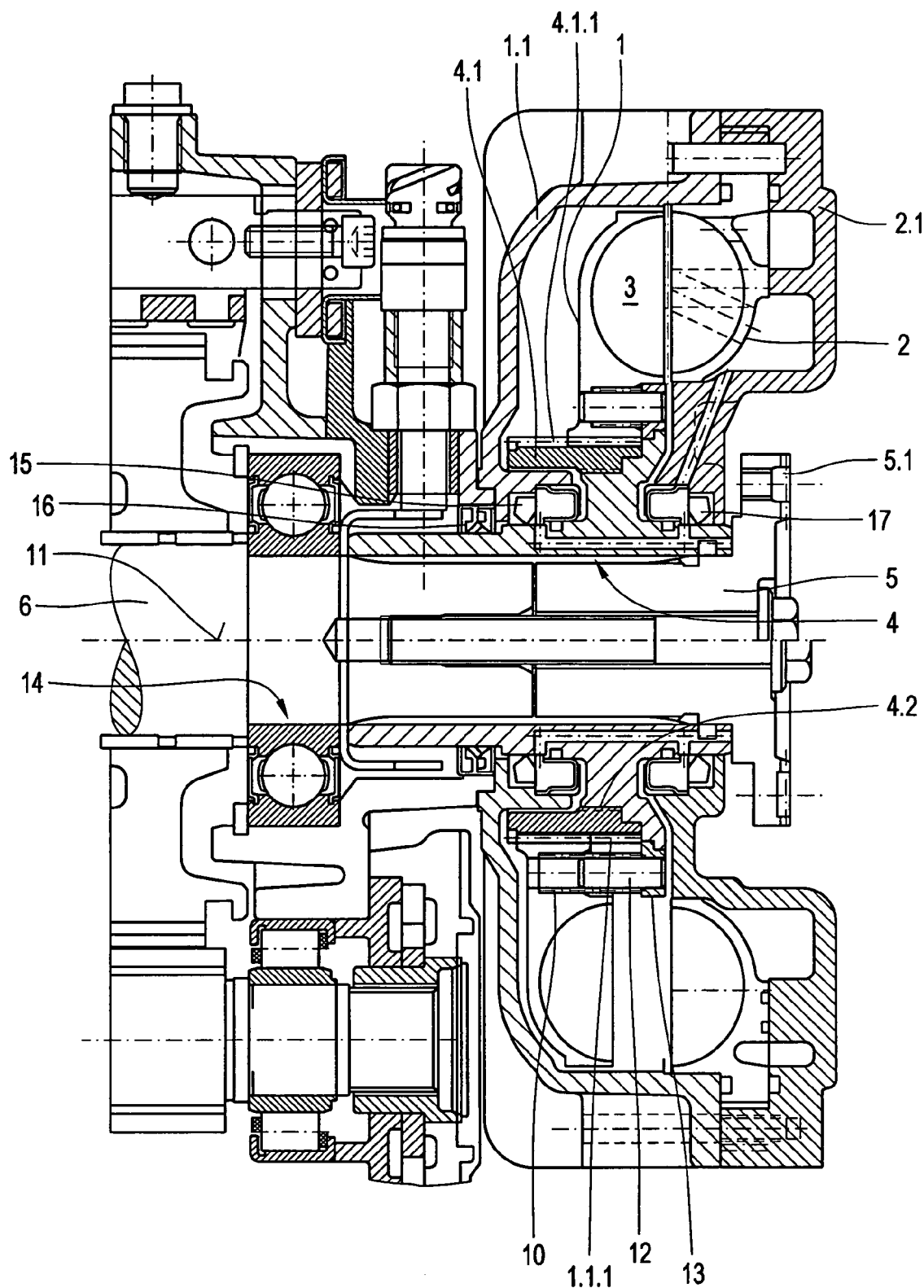
FIG. 1 shows a section through as advantageous configuration of the retarder in accordance with an embodiment of the invention.

The rotor illustrated in FIG. 1 is made up as follows: a rotor 1 and a stator 2 are each of them developed as impeller wheels and form with one another a torus-shaped working space 3. The rotor sits upon a hollow shaft 4. This is torsionally firmly connected with a shaft 5 which is close to a prop shaft, which is not shown here, as well as a shaft 6 which is close to a transmission not shown here. The shaft 5 is insertable into the hollow shaft 4. It is provided with a flange 5.1 for the transfer of torsional momentum.

Stator 2 features a stator casing 2.1. rotor 1 features a rotor casing 1.1.

Rotor 1 is indirectly borne by the hollow shaft 4. The hollow shaft 4 for its part bears a ring follower 4.1. This features on its outside circumference a coarse-pitch screw thread 4.1.1. Rotor 1 is on its inside circumference provided with an appropriate coarse-pitch screw thread 1.1.1. The screw threads 4-1-1 and 1.1.1 work together with one another. They have a screw pitch to meet the requirements of the function and in particular to provide a relatively large screw pitch. On account of this functional collaboration the rotor 1 will carry out a movement in an axial direction, thereby effecting an alteration in its clearance distance from stator 2.

The connection between screw thread ring 4.1 and shaft 4 is in the case submitted a screw connection—cf. screw thread ring 4.2. However, it could thereby equally well be any other sort of a connection, also a non-detachable connection such as, for instance, a welded connection.

Decisive is that there should be a spring device with which thrust can be exerted in an axial direction on rotor 1, and in fact in such a manner that a distancing of rotor 1 from stator 2 is effected. To this end several springs 10 are provided. These are grouped around the retarder axis and are, in fact, at an equal clearance distance. Thereby a large number of springs 10 can be provided. These can be grouped in the same, or in a group-formed equal angle of clearance distance around the retarder axis 11.

A suspender ring 13 can be recognized. This encircles the hollow shaft 4. It carries bolts 12 and in so doing also springs 10.

It is important that suspender ring 13 has its bearings on the hollow shaft 4 in such a way that it is, in relative comparison to the hollow shaft 4, freely rotational. This has the consequent effect that the springs 10 for their entire length and with any and every kind of thrust revolution movement of the rotor 1 can execute a tilt-free and unimpeded relative rotation around the retard axis 11. Thereby there will be prevented a tilting of the springs 10.

In addition a layout can also be arranged whereby the bolts 12 are freely rotational around their own longitudinal axis. To this purpose the bearings of the bolts 12 in the suspender ring 13 must be appropriately configured.

Further details are also recognizable, but they are not of primary significance for the invention.

Thereby the entire unit—encompassing rotor 1, stator 2, hollow shaft 4, shaft 5 and shaft 6 have by means of their transmission-sided bearings, in particular by means of a ball bearing 14, unsupported bearings. Furthermore the usual gaskets are also provided—cf. the gaskets 15, 16, 17.

Instead of the bolt 12, on which the springs 10 glide, sleeves can also be provided (not illustrated here) which surround the springs and which similarly carry out a guide function.

In any case, the guide elements (bolts or sleeves) are measured in such a way that the individual springs 10 are reliably guided in every position of rotor 1.

The afore-mentioned screw thread 4.1.1 between threading 4.1 and rotor 1 can be a so-called coarse-pitch screw thread. One could also speak of a thread-shaped or screw-shaped gear-tooth formation.

In non-braking operation, i.e. during normal travel, the working space 3 is opened. This is illustrated in the lower portion of FIG 1. The rotor 1 has traveled away from stator 2 and this was in fact, effected by the springs 10.

By contrast, in the braking operation the working space 3 is closed. This is illustrated in the upper part of the figure. The closure takes place, thereby, automatically and against the force of the springs- If, in fact, a work medium, for example oil, is fed into the initially still opened woring space 3, there will arise a traveling of the rotor 1 to the stator 2 on account of the hydrodynamic forces which will be exerted by both of the impeller wheels.

Figure 2:
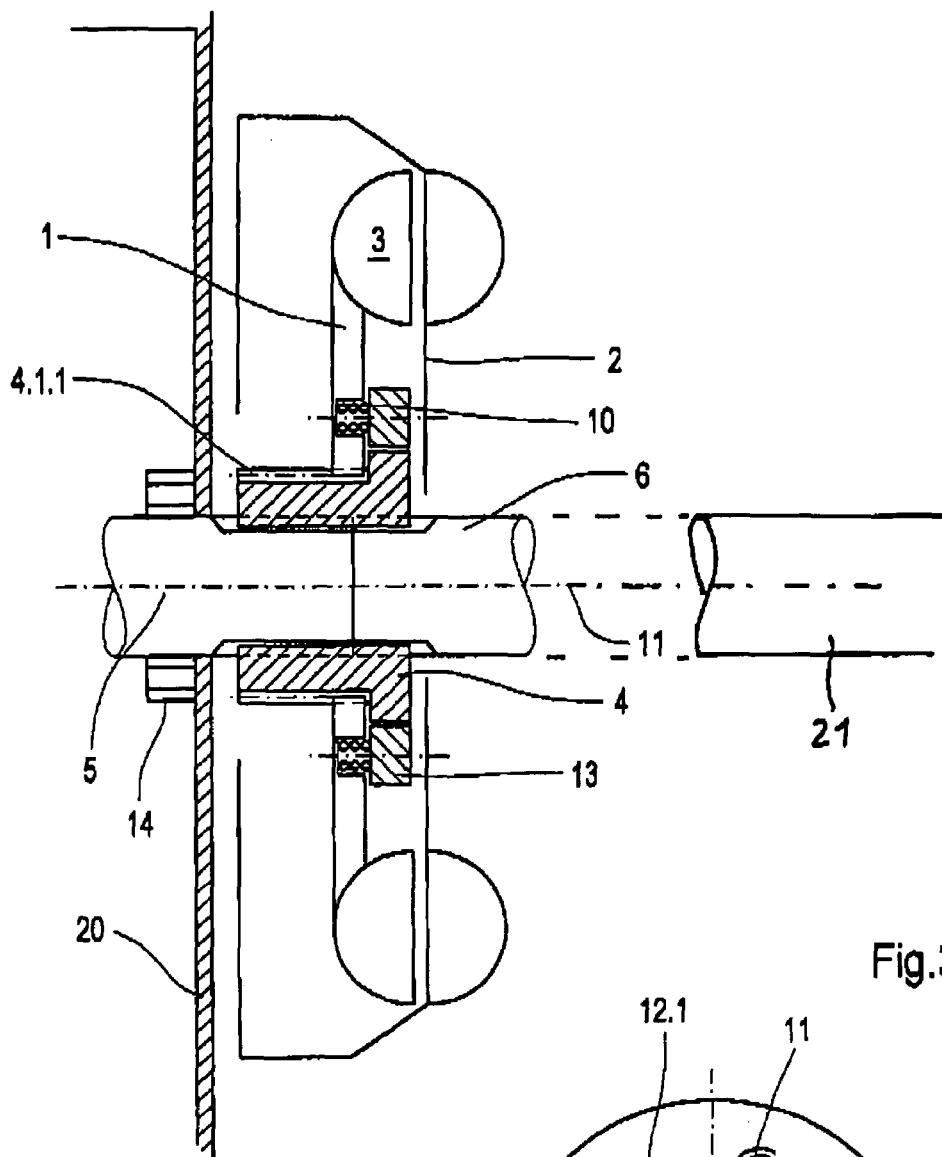
FIG. 2 shows in a schematic sectional elevation an execution of the retarder.

FIG. 2 shows once more in a simplified, schematic illustration the significant elements of an advantageous execution of the invention. As one sees, in this execution example the hollow shaft fulfils three functions: for one thing it constitutes a firm connection between the input shaft 5 and the output shaft 6 close to cardan shaft 21. Furthermore it carries, by means of a screw thread 4.1.1, the rotor 1. Finally, the suspender ring 13 is freely rotational around its longitudinal axis, which is axis-parallel to the longitudinal axis of the retarder, laid out rotationally on shaft 4, which is to say that the hollow shaft is also carrying suspender ring 13.

The springs 10 produce a pressure force between rotor 1 and suspender ring 13 so that in non-breaking operation rotor 1 is axially driven away from stator 2.

All circulating parts are laid out in such a way that the retarder is free of its own bearings, that is to say that all rotating parts have unsupported bearings by virtue of the ball bearing 14 in the transmission bearing. The stator 2 can be flanged together with the fixed-position component of the retarder, for example on the transmission 20.

Figure 3:
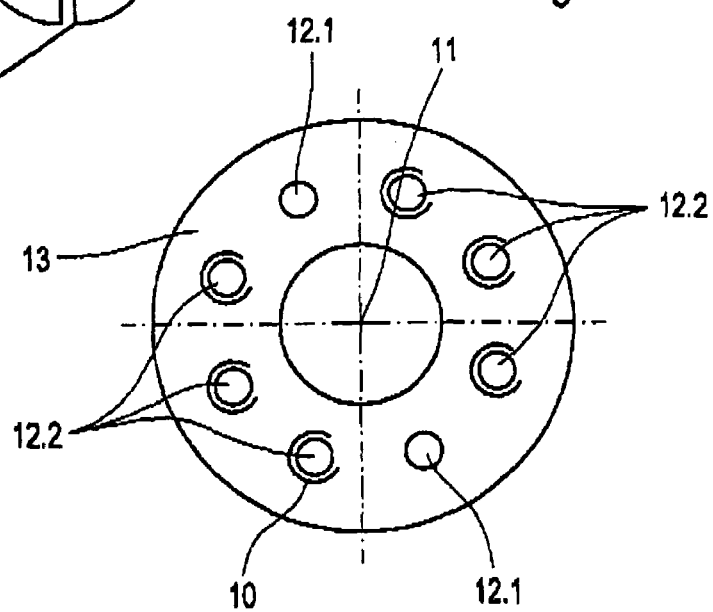
FIG. 3 shows an advantageous configuration of the connection between the suspender ring and the rotor.

FIG. 3 shows an advantageous configuration of the connection between the suspender ring 13 and the rotor 1. The suspender ring 13 contains a number of drillings in which bolts 12 are accommodated, which are axis-parallel in alignment to the longitudinal axis 11 of the retarder. According to this configuration two different groups of bolts 12 assume different functions. Thereby the bolts 12.1 serve to provide a torsionally firm connection between the suspender ring 13 and the rotor 1, whilst the bolts 12.2 have the function of guiding springs 10. The springs 10 exert the required pressure power in order to drive away the rotor 1 from the stator 2 in non-braking operation.

Through this advantageous further development the bolt connections can be adjusted in a fashion appropriate to their function. Thus one can consider fitting in the bolts 12.1 both by means of a diminishing connection into the rotor 1 and into the suspender ring 13, whilst the bolts 12.2 can loosely project, with some play, into the rotor 1 and are only installed in a fixed position in the suspender ring 13 by means, for instance, of a diminishing connection.

Thus it is possible to differentiate between two different variations in the transfer of the revolution movement from the rotor onto the suspender ring. In the first variation the revolution movement is transferred via the rotor drillings, the springs and bolts, and any optional number of springs as desired, onto the suspender ring, whereby any optional number of bolts and any optional number of springs form a unit. In this variation the springs are, so to speak, jammed in between the rotor drillings and bolts during the transfer of the revolution movement. However, a second variation is particularly advantageous, namely that involving the illustrated division of functions, by which the bolts only take on the guiding of the springs and a transfer of certain revolution movement and the springs exert forces with an exclusively axial effect and which do not make a contribution to the transfer of the revolution momentum. Advantageously, the revolution movement is exclusively transferred onto the suspender ring by at least two separate bolts.

As can be seen from the figures, the suspender ring shores itself up to advantage against the primary part, namely the rotor. this has the advantage that the suspender ring is exposed to a particularly low degree of wear and tear since a relative movement between rotor and suspender ring can at most arise for short periods in switching-on, or respectively switching-off phases.

The invention claimed is:

1. A retarder comprising:
    a rotor and a stator which mutually form a working chamber;
    a hollow shaft mechanically torsionally rigidly connected with an input shaft close to a transmission and mechanically torsionally rigidly connected to an output shaft close to a cardan shaft;
    said hollow shaft carrying said rotor by means of a screw thread; and
    a plurality of restoring springs spaced about a longitudinal axis of said retarder and exerting an axial thrust force on said rotor so as to axially displace said rotor;
    said springs being mounted to be freely rotatable about the longitudinal axis during axial displacement of said rotor.

2. The retarder of claim 1 wherein said springs are helical springs having respective axes, said springs are rotatable about their own axes while said rotor is displaced in an axial direction.

3. The retarder of claim 2 and including a suspender ring coaxial to the longitudinal axis of said retarder and freely rotatable about said axis and relative to said hollow shaft by means of bearing means, said suspender ring including guide bodies guiding said springs.

4. The retarder of claim 3 wherein said guide bodies are axis-parallel bolts on which said springs slide.

5. The retarder of claim 3 wherein said guide bodies are sleeves that encase said springs.

6. The retarder of claim 3 wherein said rotor includes drillings by which said springs are guided and which pass on the rotation of said rotor onto said springs, said guide bodies and thereby said suspender ring.

7. The retarder of claim 3 wherein said guide bodies do not connect said suspender ring to said rotor to transfer rotation of the rotor to said suspender ring; and including one more elements connecting said suspender ring to said rotor to thereby transfer rotation of the rotor to said suspender ring.

8. A retarder comprising:
    a rotor and a stator which mutually form a working chamber;
    a hollow shaft for torsionally rigid connection with an input shaft close to a transmission and a torsionally rigid connection to an output shaft close to a cardan shaft;
    said hollow shaft carrying said rotor by means of a screw thread;
    a plurality of restoring springs spaced about a longitudinal axis of said retarder and exerting an axial thrust force on said rotor so as to axially displace said rotor;
    said springs being mounted to be freely rotatable about the longitudinal axis during axial displacement of said rotor; and
    a suspender ring coaxial to the longitudinal axis of said retarder and freely rotatable about said axis and relative to said hollow shaft by means of bearing means, said suspender ring including guide bodies guiding said springs.

9. The retarder of claim 8 wherein said guide bodies are axis-parallel bolts on which said springs slide.

10. The retarder of claim 8 wherein said guide bodies are sleeves that encase said springs.

11. The retarder of claim 8 wherein said rotor includes drillings by which said springs are guided and which pass on the rotation of said rotor onto said springs, said guide bodies and thereby said suspender ring.

12. The retarder of claim 8 wherein said guide bodies do not connect said suspender ring to said rotor to transfer rotation of the rotor to said suspender ring; and including one more elements connecting said suspender ring to said rotor to thereby transfer rotation of the rotor to said suspender ring.

* * * * *